US012804012B2

(12) United States Patent
Negrete et al.

(10) Patent No.: US 12,804,012 B2
(45) Date of Patent: Nov. 17, 2026

(54) AUGMENTATION OF PHISHING WEBSITE PREDICTOR USING COOKIE METADATA

(71) Applicant: CISCO TECHNOLOGY, INC., San Jose, CA (US)

(72) Inventors: Joanna Negrete, Brentwood, CA (US); Supraja Krishnan, Milpitas, CA (US); Mugdha Shailesh Gumphekar, San Jose, CA (US); Mincy M Chelliyil, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 135 days.

(21) Appl. No.: 18/657,322

(22) Filed: May 7, 2024

(65) Prior Publication Data

US 2025/0350637 A1 Nov. 13, 2025

(51) Int. Cl.
*H04L 29/06* (2006.01)
*H04L 9/40* (2022.01)

(52) U.S. Cl.
CPC ................................ *H04L 63/1483* (2013.01)

(58) Field of Classification Search
CPC ........................ H04L 63/0485; H04L 63/1483
See application file for complete search history.

(56) References Cited

U.S. PATENT DOCUMENTS 8,312,543 B1 * 11/2012 Gardner .................. H04L 67/02 726/22
2019/0014149 A1 * 1/2019 Cleveland ........... H04L 63/1483
2020/0067979 A1 2/2020 Wright et al.
2020/0252413 A1 * 8/2020 Buzbee ................. G06F 21/629
2021/0203693 A1 7/2021 Clausen et al.
2022/0070215 A1 3/2022 Stolfo et al.
2023/0065787 A1 3/2023 Akhter et al.

OTHER PUBLICATIONS

Zhou et al., A Novel Phishing Website Detection Model Based on LightGBM and Domain Name Features, Symmetry, Jan. 7, 2023, 15 pages, vol. 15, 180, MDPI, Switzerland.

* cited by examiner

*Primary Examiner* — Wasika Nipa
(74) *Attorney, Agent, or Firm* — Burris Law, PLLC

(57) ABSTRACT

In one embodiment, a method for detecting phishing activity by a webpage is provided. The method includes: receiving, by a processor, webpage data associated with the webpage; analyzing, by the processor, the webpage data to determine if at least one of a brand logo and credential entry box is present; in response to a determination that the brand logo is present or the credential entry box is present: extracting, by the processor, cookie feature data from the webpage data; determining, by the processor, cookie score data based on an analysis of the cookie feature data with a cookie model; predicting, by the processor, fraudulent content of the webpage based on the cookie score data and a prediction model; and generating, by the processor, notification data including an indication of the fraudulent content.

20 Claims, 4 Drawing Sheets

AUGMENTATION OF PHISHING WEBSITE PREDICTOR USING COOKIE METADATA

TECHNICAL FIELD

The present disclosure relates generally to internet security systems and more particularly to security systems for predicting phishing websites on the internet.

BACKGROUND

The statements in this section merely provide background information related to the present disclosure and may not constitute prior art.

Phishing is a form of cyberattack that uses email, phone, text, or websites in order to induce individuals to reveal personal information or other secured information, such as passwords and credit card information. Page or site phishing uses fraudulent websites with login screens or other data entry fields to impersonate a trustworthy entity often by transparently mirroring their legitimate website.

Security systems utilize many phishing detection approaches to identify and block such site phishing in order to keep internet users safe and to avoid financial or reputation loss from theft. Phishing site designers may become aware of such phishing detection approaches and create design arounds to avoid being detected.

Accordingly, it is desirable to provide improved methods and systems for detecting phishing through fraudulent websites. Furthermore, other desirable features and characteristics of the present disclosure will become apparent from the subsequent detailed description and the appended claims, taken in conjunction with the accompanying drawings and the foregoing technical field and background.

BRIEF DESCRIPTION OF THE DRAWINGS

In order that the disclosure may be well understood, there will now be described various forms thereof, given by way of example, reference being made to the accompanying drawings, in which.

DESCRIPTION OF EXAMPLE EMBODIMENTS

Figure 1:
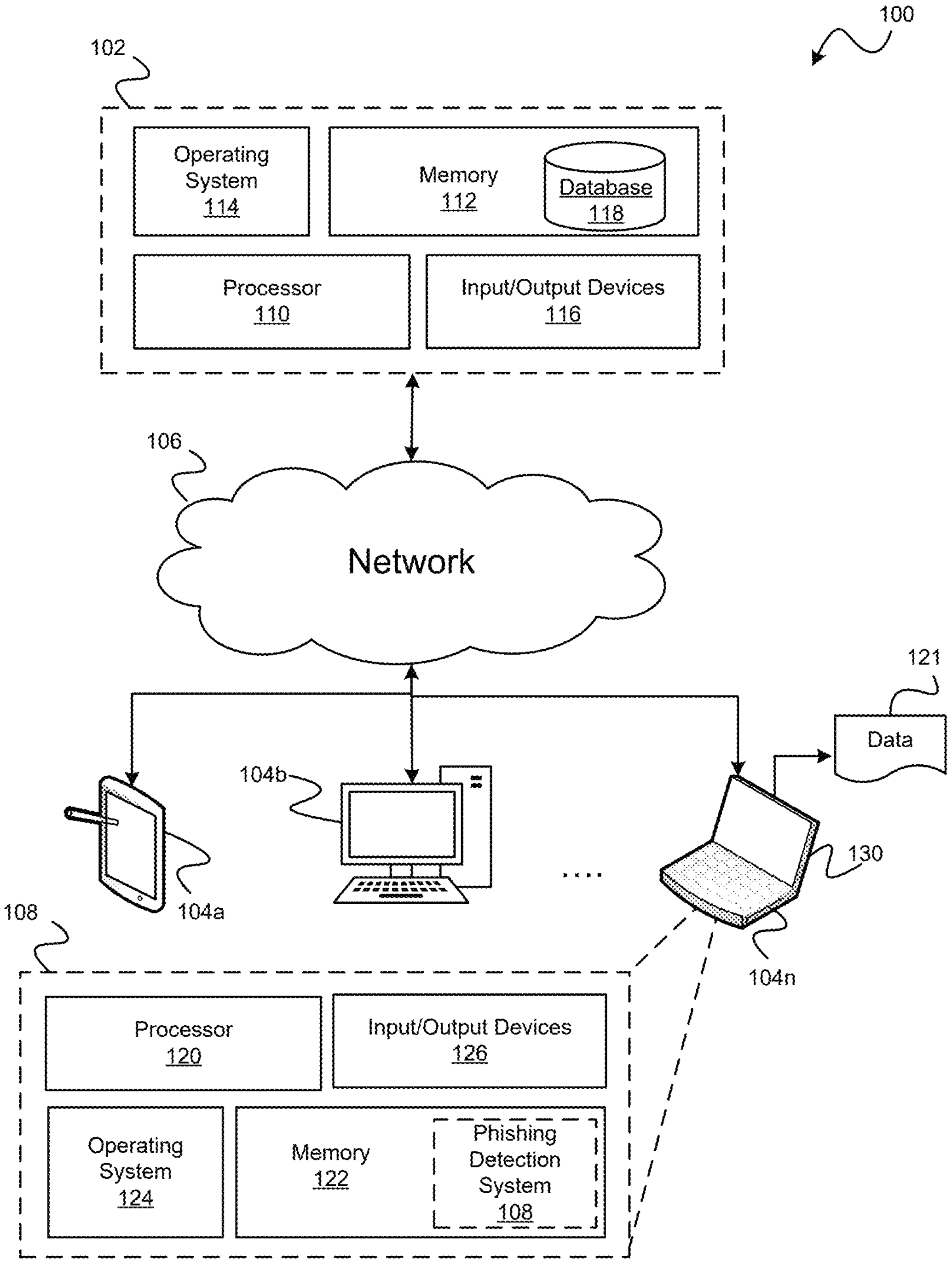
FIG. 1 is a functional block diagram illustrating an example computing system having a phishing detection system in accordance with various embodiments.

The following description is merely exemplary in nature and is not intended to limit the present disclosure, application, or uses. It should be understood that throughout the drawings, corresponding reference numerals indicate like or corresponding parts and features. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Overview

According to various embodiments, phishing detection methods, systems, and computer program products are provided for detecting phishing activity by a webpage. A method includes: receiving, by a processor, webpage data associated with the webpage; analyzing, by the processor, the webpage data to determine if at least one of a brand logo and credential entry box is present; in response to a determination that the brand logo is present or the credential entry box is present: extracting, by the processor, cookie feature data from the webpage data; determining, by the processor, cookie score data based on an analysis of the cookie feature data with a cookie model; predicting, by the processor, fraudulent content of the webpage based on the cookie score data and a prediction model; and generating, by the processor, notification data including an indication of the fraudulent content.

Example Embodiments

With reference to FIG. 1, an exemplary computer environment is shown generally at 100 having a server system 102 of one or more servers that are communicatively coupled to one or more computer systems 104*a*-104*n* through a network 106. The computer environment 100 is shown having a phishing detection system 108 in accordance with various embodiments. As can be appreciated, the phishing detection system 108 disclosed herein may be located on the computer systems 104*a*-104*n*, located on the server system 102, located on a device or node of the network 106, or distributed between any of the server system 102, the computer systems 104*a*-104*n*, and one or more devices or nodes of the network 106. For exemplary purposes, the disclosure will be discussed in the context of the phishing detection system 108 being implemented on one of the one or more of the computer systems 104*a*-104*n*.

In various embodiments, server system 102 stores and makes available dynamic web content to users of the computer environment 100. In some instances, the web content may be fraudulent web content or content used to entice users to provide confidential information. The server system 102 generally operates with any sort of conventional processing hardware, including, but not limited to, at least one processor 110, memory 112, an operating system 114, an input/output device 116, and a database 118 that stores the dynamic web content.

The processor 110 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 112 represents any non-transitory short- or long-term storage or other computer-readable media capable of storing programming instructions for execution on the processor 110, including any sort of random access memory (RAM), read only memory (ROM), flash memory, magnetic or optical mass storage, and/or the like. The computer-executable programming instructions, when read and executed by the processor 110, cause the processor 110 to create, generate, or otherwise facilitate the communication of the dynamic web content and perform one or more additional tasks, operations, functions, and/or processes described herein. In various embodiments, the memory 112 includes the database 118 that stores the dynamic web content. As can be appreciated, the memory 112 represents one suitable implementation of such computer-readable media, and alternatively or additionally, the processor 110 could receive and cooperate with external computer-readable media that is realized as a portable or mobile component or application platform, e.g., a portable hard drive, a USB flash drive, an optical disc, or the like.

The operating system 114 includes computer-executable programming instructions, when read and executed by the processor, cause the processor to operate the computer system's basic functions such as scheduling tasks, executing applications, memory allocation, and controlling the input/output devices 116. The input/output devices 116 generally represents the interface(s) to networks (e.g., to the network 106, or any other local area, wide area, or other network), mass storage, display devices, data entry devices, and/or the like.

In various embodiments, the network 106 generally includes interconnected network nodes that are arranged according to one or more of a variety of network topologies and that are configured to communicate data according to one or more communication protocols. The network nodes can include, for example, network interface controllers, repeaters, hubs, bridges, switches, routers, firewalls, modems, etc. The network nodes may be interconnected based on physically wired, optical, and/or wireless radio-frequency topologies.

Each of the one or more computer systems 104*a*-104*n* (referred to generally as computer system 104) generally includes any sort of personal computer, mobile telephone, tablet, or other network-enabled client device on the network 106. The computer system 104 generally operates with any sort of conventional processing hardware, including but not limited to, at least one processor 120, memory 122, an operating system 124, an input/output device 126. The processor 120 may be implemented using any suitable processing system, such as one or more processors, controllers, microprocessors, microcontrollers, processing cores and/or other computing resources spread across any number of distributed or integrated systems, including any number of "cloud-based" or other virtual systems.

The memory 122 represents any non-transitory short- or long-term storage or other computer-readable media capable of storing programming instructions for execution on the processor 120, including any sort of random access memory (RAM), read only memory (ROM), flash memory, magnetic or optical mass storage, and/or the like. The computer-executable programming instructions, when read and executed by the processor, cause the processor to create, generate, or otherwise facilitate the operations, functions, and/or processes described herein. It should be noted that the memory 122 represents one suitable implementation of such computer-readable media, and alternatively or additionally, the processor 120 could receive and cooperate with external computer-readable media that is realized as a portable or mobile component or application platform, e.g., a portable hard drive, a USB flash drive, an optical disc, or the like. The memory 122 may store the phishing detection system 108 in various embodiments.

The operating system 124 includes computer-executable programming instructions, when read and executed by the processor 120, cause the processor 120 to operate the computer system's basic functions such as scheduling tasks, executing applications, memory allocation, and controlling input/output devices. The input/output device generally represents the interface(s) to networks (e.g., to the network 106, or any other local area, wide area, or other network), mass storage, display devices, data entry devices and/or the like.

In an exemplary embodiment, the computer system 104 includes or communicates with a display device 130, such as a monitor, screen, or another conventional electronic display capable of presenting the web content retrieved from the server system 102 or other internet device via the network 106.

According to a typical use case, a user operates a conventional browser application or other client program such as an application executed by the computer system 104 to contact the server system 102 via the network 106 using a networking protocol, such as the hypertext transport protocol (HTTP) or the like. Dynamic web or other content is then presented and viewed by the user, as desired, via the display device 130. In various embodiments, the phishing detection system 108 operates on the dynamic web content to make predictions of fraudulent content and notify the user or other devices such as devices of the network 106 or the server system 102 of such fraudulent content.

In various embodiments, the dynamic web content includes cookies or small blocks of data created while the user is browsing the webpage during a web session. Cookies are generally stored on the user's computer system or other device by the web browser. The cookies may have associated data that enables webpages to store stateful information (such as items added in the shopping cart in an online store) on the user's device or to track the user's browsing activity (including clicking particular buttons, logging in, or recording which pages were visited in the past). Cookies can also be used to save information that the user previously entered into form fields, such as names, addresses, passwords, and payment card numbers for subsequent use.

As will be discussed herein in more detail, the phishing detection system 108 detects the fraudulent content and provides an indication of trustworthiness based on an analysis of cookie information and other information obtained from a webpage of the web content. In various embodiments, the information analyzed includes information from the visual appearance of the webpage, information from cookies associated with the webpage, and information from the uniform resource locator (URL) of the webpage.

Figure 2:
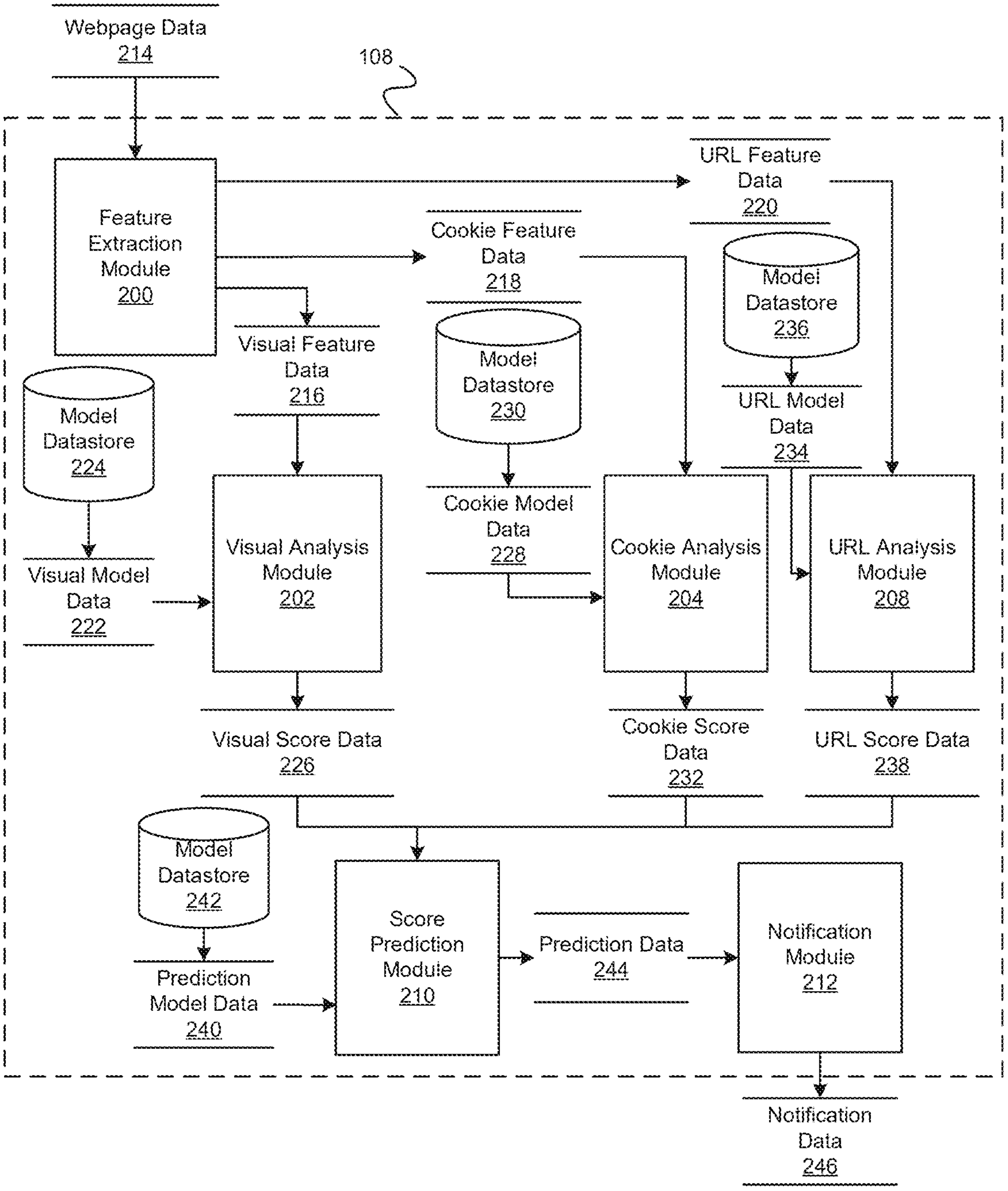
FIG. 2 is a dataflow diagram illustrating an example phishing detection system in accordance with various embodiments.

With reference now to FIG. 2, a dataflow diagram illustrates the phishing detection system 108 in accordance with various embodiments. As can be appreciated, various exemplary embodiments of the phishing detection system 108, according to the present disclosure, may include any number of modules and/or sub-modules. In various exemplary embodiments, the modules and sub-modules shown in FIG. 3 may be combined and/or further partitioned to similarly detect phishing activity on the internet. In various embodiments, the phishing detection system 108 includes a feature extraction module 200, a visual analysis module 202, a cookie analysis module 204, a URL analysis module 208, a score prediction module 210, and a notification module 212.

In various embodiments, the feature extraction module 200 receives as input webpage data 214 including information identifying a webpage and associated cookie information from web content accessed by a user. The feature extraction module 200 analyzes the webpage data 214 and extracts an image of the webpage that shows all the visual content. The feature extraction module 200 analyzes the visual content to determine if brand logos are present or text boxes associated with login credentials or other personal information are present. When the feature extraction module 200 determines that a brand logo or other text boxes are present, the feature extraction module 200 extracts other features from the webpage data 214.

In various embodiments, the feature extraction module 200 extracts visual features such as, but not limited to, brand logos, credential/login prompt boxes, informational text content, and internal hyperlinks and generates visual feature data 216 based thereon. In various embodiments, the feature extraction module 200 extracts cookie features such as natural language processing (NLP) based cookie features such as, but not limited to, cookie names, a length of cookie names, or other features such as, but not limited to, the length of cookie values, the cookie lifespan, the presence of unique identifier session cookies, the presence of first party cookies, the presence of third party cookies, a ratio of first party to third party cookies and generates cookie feature data 218 based thereon. In various embodiments, the feature extraction module 200 extracts URL features such as, but not limited to, a URL length, a URL depth or direction, binary executables, and URL token attributes and generates URL feature data 220 based thereon.

In various embodiments, the visual analysis module 202 receives the visual feature data 216. The visual analysis module 202 further retrieves visual model data 222 from a visual model datastore 224 and processes the visual feature data 216 with the visual model data 222 to generate a visual score indicating a level of suspiciousness associated with the visual features of the webpage. The visual analysis module 202 generates visual score data 226 based on the visual score.

In various embodiments, the visual model data 222 defines a visual classifier including a deep learning model that has been trained on a dataset of sample visual features such as brand logo, credential text prompts, diagrams, and infographics. For example, a deep learning model such as a Siamese Computational Neural Network (CNN) is trained as a classifier to compute a score indicating the level of suspiciousness of the image of the webpage. Such convolutional neural networks can be trained in a supervised or unsupervised manner to find subtle differences between the legitimate version of a webpage and a potentially fraudulent version. As can be appreciated, other machine learning techniques such as decision trees, support vector machines (SVMs), regression analysis, Gaussian processes, Bayesian networks, and/or a combination thereof can be used to produce the visual score based on the visual feature data 216.

In various embodiments, the cookie analysis module 204 receives as input the cookie feature data 218. The cookie analysis module 204 further retrieves cookie model data 228 from a cookie model datastore 230 and processes the cookie feature data 218 with the cookie model data 228 to generate a cookie score indicating a level or degree of suspiciousness associated with the cookie content of the webpage. The cookie analysis module 204 generates cookie score data 232 based on the cookie score.

Figure 3:
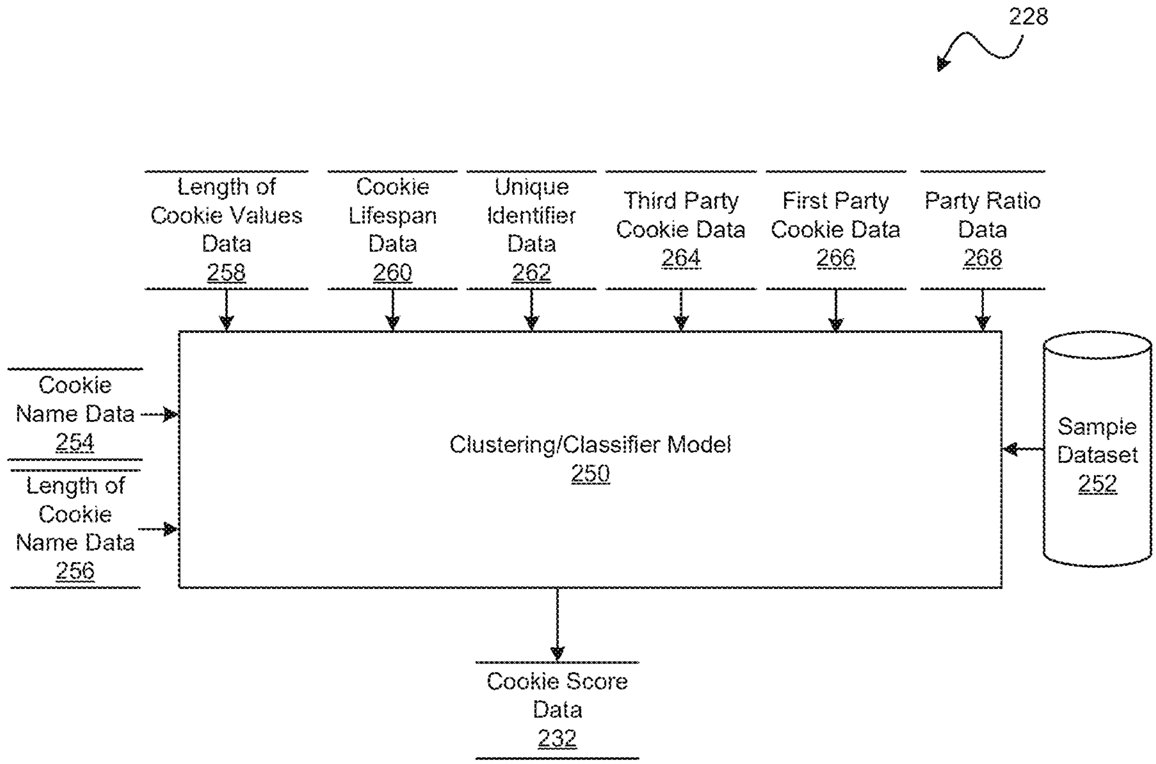
FIG. 3 is a dataflow diagram illustrating a model of the phishing detection system in accordance with various embodiments.

In various embodiments, as shown in more detail in FIG. 3, the cookie model data 228 defines a pattern-based classifier including a clustering and/or classifier model 250 that has been trained in an unsupervised and/or supervised manner on a dataset 252 of sample cookie features. The clustering and/or classifier model 250 operates on the cookie feature data 218 including cookie name data 254, length of cookie names data 256, lengths of cookie values data 258, cookie lifespan data 260, unique identifier data 262, third party cookie data 264, first part cookie data 266, and party ratio data 268 using, for example, a k-means clustering method or other method to look for patterns and regularities in the feature data 218. As can be appreciated, other clustering techniques such as fuzzy c-means clustering, Gaussian clustering, etc. and/or a combination thereof can be used to produce the cookie score as the disclosure is not limited to the present examples. As can further be appreciated, other classification methods can be included in the clustering and/or classifier model 250 such as, but not limited to, decision trees, support vector machines (SVMs), regression analysis, Gaussian processes, Bayesian networks, and/or a combination thereof can be used in combination with or as an alternative to the clustering techniques to produce the cookie score as the disclosure is not limited to the present examples.

With reference back to FIG. 2, in various embodiments, the URL analysis module 208 receives the URL feature data 220. The URL analysis module 208 further retrieves URL model data 234 from the URL model datastore 236 and processes the URL feature data 220 with the URL model data 234 to generate a URL score. The URL score indicates a level of suspiciousness associated with the URL content of the webpage. The URL analysis module generates URL score data 238 based on the URL score.

In various embodiments, the URL model data 234 defines lexical model that has been trained on a dataset including sample URL features. For example, an lexical model including a lexical classifier, such as a bi-directional encoder representations from transporters (BERT) natural language processing model is trained on a dataset containing URL tokens and their characteristics. As can be appreciated, these NLP models can be trained to find subtle differences between the legitimate version of a webpage and a potentially fraudulent version. As can be appreciated, in various embodiments, other language models can be used to produce the URL score as the disclosure is not limited to the present examples.

In various embodiments, the score prediction module 210 receives as input the visual score data 226, the cookie score data 232, and the URL score data 238. The score prediction module 210 further retrieves prediction model data 240 from the prediction model datastore 242 and processes the score data 226, 232, and 238 with the prediction model data 240 to generate prediction data 244 indicating a prediction of legitimate or fraudulent for the webpage and, optionally, a degree of trust in the webpage corresponding to a confidence in the prediction. In various embodiments, the prediction model is a rule-based model or a logistical regression model that indicates fraudulent or legitimate based on the values of the scores. In various embodiments, the logistical regression model further provides a prediction confidence or probability which may be provided as a degree of trust in the webpage.

In various embodiments, the notification module 212 receives as input the prediction data 244. The notification module 212 generates notification data 246 based on the values of the prediction data 244. For example, the notification data 246 includes interface data having text and/or graphics that are displayed to the user indicating the values of the prediction. In another example, the notification data 246 includes list data (e.g., list of web content to be blocked) having URL information and the associated prediction values that are communicated to the network 106 and/or the server system 102. As can be appreciated, in various embodiments, other notification data can be generated to notify the user and/or other systems of the possible fraudulent webpage as the disclosure is not limited to the present examples.

Figure 4:
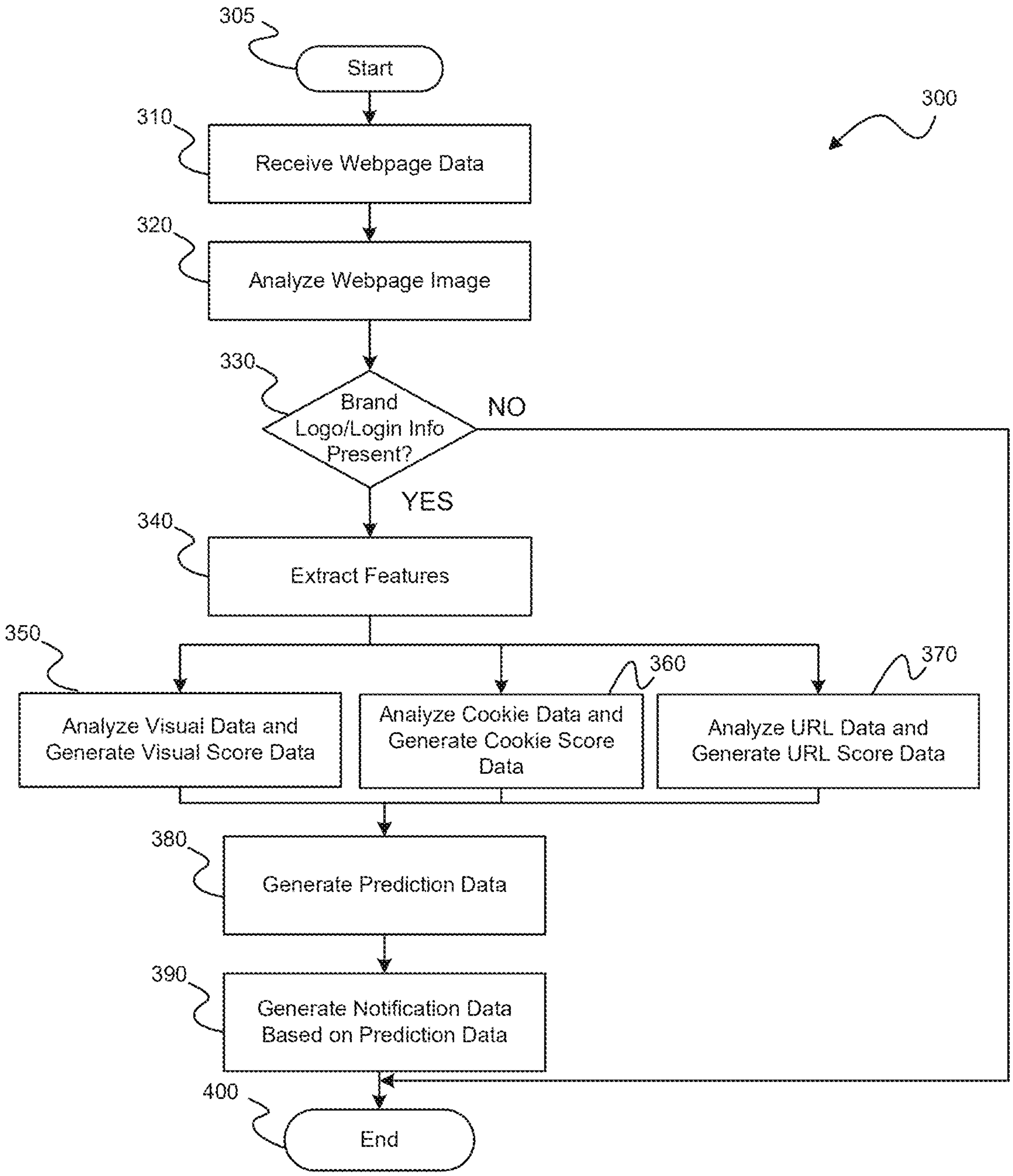
FIG. 4 is a flowchart illustrating an example phishing detection method that may be performed by the phishing detection system in accordance with various embodiments.

With reference now to FIG. 4 and with continued reference to FIGS. 1-3, a process flowchart illustrating an example process 300 for detecting phishing activity on the internet is shown in accordance with various embodiments. In various forms, the process 300 may be performed by the phishing detection system 108. As can be appreciated in light of the disclosure, the order of operations performed by the process 300 is not limited to the sequential execution as illustrated in FIG. 4 but may be performed in one or more varying orders as applicable and in accordance with the present disclosure. In various embodiments, the process 300 can be scheduled to run based on one or more predetermined events or run automatically based on an occurrence of one or more events.

In one example, the process 300 may begin at 305. A webpage is identified at 310 and webpage data 214 is received. Thereafter, a webpage image from the webpage data 214 is analyzed to determine whether a brand logo or login prompt box is present at 320. When a brand logo or login prompt is not present at 330, the process 300 may end at 400.

When the brand logo or login prompt box is present at 330, the webpage data 214 is processed to extract feature data, including visual feature data 216, cookie feature data 218, and URL feature data 220 at 340, for example by the feature extraction module 200. Thereafter, the extracted data 216, 218, 220 is then analyzed by the visual analysis model, for example, by the visual analysis module 202, the cookie analysis model, for example, by the cookie analysis module 204, and the URL analysis model, for example by the URL analysis module 208, to produce visual score data 226, cookie score data 232, and URL score data 238 at 350, 360, and 370, respectively.

Thereafter, the score data 226, 232, 238 is analyzed by a webpage prediction model, for example, by the score prediction module 210, to produce prediction data 244 indicating whether the webpage is legitimate or fraudulent and/or a degree of trust of the prediction at 380. Thereafter, notification data 246 is generated to notify the user and/or other systems of the prediction at 390, for example, by the notification module 212. The process 300 may end at 400.

As used herein, the phrase at least one of A, B, and C should be construed to mean a logical (A OR B OR C), using a non-exclusive logical OR, and should not be construed to mean "at least one of A, at least one of B, and at least one of C."

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for detecting phishing activity by a webpage, comprising:

receiving, by a processor, webpage data associated with the webpage;

analyzing, by the processor, the webpage data to determine if at least one of a brand logo or a credential entry box is present;

in response to a determination that the brand logo is present or the credential entry box is present:

extracting, by the processor, cookie feature data from the webpage data;

determining, by the processor, cookie score data based on an analysis of the cookie feature data with a cookie model, wherein the cookie model includes a pattern-based classifier including a clustering and/or classifier model trained to look for patterns or regularities in the cookie feature data;

predicting, by the processor, fraudulent content of the webpage based on the cookie score data and a prediction model; and generating, by the processor, notification data including an indication of the fraudulent content.

2. The method of claim 1, wherein the cookie feature data further includes at least one of a presence of a unique identifier session cookie, a presence of a first party cookie, a presence of a third party cookie, or a ratio of first party to third party cookies.

3. The method of claim 1, wherein the clustering and/or classifier model is trained on a dataset associated with the cookie feature data.

4. The method of claim 3, wherein the cookie model is trained to look for similarities in the cookie feature data.

5. The method of claim 1, further comprising:

extracting, by the processor, visual feature data from the webpage data; and determining, by the processor, visual score data based on an analysis of the visual feature data with a visual model, wherein the predicting, by the processor, the fraudulent content of the webpage is further based on the visual score data.

6. The method of claim 5, wherein the visual feature data includes at least one of a brand logo, a credential/login prompt box, informational text content, or an internal hyperlink.

7. The method of claim 1, further comprising:

extracting, by the processor, uniform resource locator (URL) feature data from the webpage data; and determining, by the processor, URL score data based on an analysis of the URL feature data with a URL model, wherein the predicting, by the processor, the fraudulent content of the webpage is further based on the URL score data.

8. The method of claim 7, wherein the URL feature data includes at least one of a URL length, a URL depth or direction, binary executables, or URL token attributes.

9. The method of claim 1, wherein the prediction model is a rule-based model that predicts fraudulent or legitimate based on a value of the cookie score data.

10. The method of claim 1, wherein the prediction model is a logistical regression model that predicts at least one of fraudulent and legitimate based on a value of the cookie score data, wherein the logistical regression model further provides a prediction confidence or probability.

11. The method of claim 1, wherein the prediction model receives as input the cookie score data together with at least one of visual score data or a uniform resource locator (URL) score data to predict the fraudulent content of the webpage.

12. The method of claim 1, wherein the cookie feature data includes at least one of a length of a name of a cookie, a length of a cookie value, or a cookie lifespan.

13. A system for detecting phishing activity by a webpage, comprising:

one or more processors;

a non-transitory computer-readable storage medium storing instructions which, when executed by the one or more processors, cause the one or more processors to:

receive webpage data associated with the webpage;

analyze the webpage data to determine if at least one of a brand logo or a credential entry box is present;

in response to a determination that the brand logo is present or the credential entry box is present:

extract cookie feature data from the webpage data;

determine cookie score data based on an analysis of the cookie feature data with a cookie model, wherein the cookie model includes a pattern-based classifier including a clustering and/or classifier model trained to look for patterns or regularities in the cookie feature data;

predict fraudulent content of the webpage based on the cookie score data and a prediction model; and generate notification data including an indication of the fraudulent content.

14. The system of claim 13, wherein the cookie feature data further includes at least one of a presence of a unique identifier session cookie, a presence of first party cookie, a presence of a third party cookie, or a ratio of first party to third party cookies.

15. The system of claim 13, wherein the clustering and/or classifier model is trained on a dataset associated with the cookie feature data.

16. The system of claim 13, wherein the computer-readable storage medium is further configured to store instructions which, when executed by the one or more processors, cause the one or more processors to:

extract visual feature data from the webpage data;

determine visual score data based on an analysis of the visual feature data with a visual model, and predict the fraudulent content of the webpage further based on the visual score data.

17. The system of claim 13, wherein the computer-readable storage medium is further configured to store instructions which, when executed by the one or more processors, cause the one or more processors to:

extract uniform resource locator (URL) feature data from the webpage data;

determine, by the processor, URL score data based on an analysis of the URL feature data with a URL model; and predict the fraudulent content of the webpage further based on the URL score data.

18. The system of claim 13, wherein the prediction model is a rule-based model that predicts fraudulent or legitimate based on a value of the cookie score data.

19. The system of claim 13, wherein the prediction model is a logistical regression model that predicts at least one of fraudulent and legitimate based on a value of the cookie score data, wherein the logistical regression model further provides a prediction confidence or probability.

20. A non-transitory computer-readable storage device storing instructions which, when executed by one or more processors, cause the one or more processors to:

receive webpage data associated with a webpage;

analyze the webpage data to determine if at least one of a brand logo or a credential entry box is present;

in response to a determination that the brand logo is present or the credential entry box is present:

extract cookie feature data from the webpage data;

determine cookie score data based on an analysis of the cookie feature data with a cookie model, wherein the cookie model includes a pattern-based classifier including a clustering and/or classifier model trained to look for patterns or regularities in the cookie feature data;

predict fraudulent content of the webpage based on the cookie score data and a prediction model; and generate notification data including an indication of the fraudulent content.

* * * * *